– | United States Patent [19] | [11] Patent Number: 4,882,946
Beyl | [45] Date of Patent: Nov. 28, 1989

[54] PEDAL FOR A BICYCLE OR SIMILAR DEVICE

[76] Inventor: Jean J. Beyl, 10, boulevard Victor Hugo, 58000 Nevers, France

[21] Appl. No.: 265,353

[22] Filed: Oct. 28, 1988

Related U.S. Application Data

[63] Continuation of Ser. No. 943,933, Dec. 19, 1986, which is a continuation-in-part of Ser. No. 48,533, May 5, 1987, Pat. No. 4,762,019, which is a continuation of Ser. No. 735,210, May 17, 1985, abandoned.

[30] Foreign Application Priority Data

| May 18, 1984 | [FR] | France | 8407786 |
| Dec. 14, 1984 | [FR] | France | 8419173 |
| Dec. 24, 1985 | [FR] | France | 8519135 |

[51] Int. Cl.[4] ............................................. G05G 1/14
[52] U.S. Cl. .................................. 74/594.6; 74/594.4; 36/131
[58] Field of Search ............... 74/594.4, 594.6, 594.5, 74/560; 36/131

[56] References Cited

U.S. PATENT DOCUMENTS

| 563,959 | 7/1896 | Grothe | 74/594.4 |
| 584,453 | 6/1897 | Bolte et al. | 74/594.4 |
| 610,175 | 9/1898 | Flindall | 74/594.4 |
| 1,144,518 | 6/1915 | Yahle | 74/594.4 |
| 1,564,188 | 12/1925 | Allen . | |
| 2,399,888 | 5/1946 | Persons . | |
| 2,567,785 | 9/1951 | Rieger | 74/594.4 |
| 3,760,653 | 9/1973 | Hagenah | 74/594.4 |
| 3,800,623 | 4/1974 | Baginski | 74/594.4 |
| 3,807,255 | 4/1974 | Baginski | 74/594.4 |
| 3,964,343 | 6/1976 | Lauterbach | 74/594.4 X |
| 4,172,392 | 10/1979 | Foster | 74/594.5 |
| 4,373,760 | 2/1983 | Durham | 74/594.4 |
| 4,445,397 | 5/1984 | Shimano | 74/594.4 X |
| 4,458,556 | 7/1984 | Schar | 74/594.6 |
| 4,662,863 | 11/1986 | Denker | 74/594.6 |
| 4,762,019 | 8/1988 | Beyl | 74/594.6 |

FOREIGN PATENT DOCUMENTS

| 43046 | 9/1937 | Belgium . | |
| 98329 | 1/1984 | European Pat. Off. | 74/560 |
| 0169080 | 1/1986 | European Pat. Off. . | |
| 3343015 | 5/1984 | Fed. Rep. of Germany . | |
| 3425044 | 1/1985 | Fed. Rep. of Germany | 74/560 |
| 1043447 | 11/1953 | France | 74/594.4 |
| 1350092 | 12/1963 | France . | |
| 2302904 | 10/1976 | France | 74/560 |
| 2564414 | 12/1986 | France . | |
| 2574743 | 2/1987 | France . | |
| 53-88949 | of 1978 | Japan . | |
| 53-88943 | 7/1978 | Japan . | |
| 60-111790 | 7/1985 | Japan . | |
| 42239 | 5/1930 | Netherlands | 74/594.4 |
| 120588 | 1/1948 | Sweden | 74/594.4 |
| 200223 | 12/1938 | Switzerland | 74/594.4 |
| 251790 | 9/1948 | Switzerland | 74/594.4 |
| 5244 | 12/1879 | United Kingdom | 74/594.4 |
| 1130971 | 10/1968 | United Kingdom . | |

OTHER PUBLICATIONS

Shimano 5540 SH Publication.

Primary Examiner—Rodney M. Lindsey
Attorney, Agent, or Firm—Cushman, Darby & Cushman

[57] ABSTRACT

A bicycle pedal comprises a pedal body which contains a housing intended to accommodate a transverse spindle capable of being fixed to a crank. The pedal body is rotatably mounted on the said spindle by means of two rotary bearings provided respectively near the ends of the spindle. The rotary bearing provided at the end of the spindle remote from the crank comprises a needle bearing whose external diameter is smaller than the external diameter of the rotary bearing situated nearer the crank; the pedal body has a bearing surface for the user's foot which passes over the needle bearing, and is spaced from the geometrical axis of the spindle by a distance that is smaller than the external radial dimension of the pedal body in the vicinity of the rotary bearing nearer the crank. The bearing surface is a portion of a flat surface and extends as far as the external edge. This surface is situated towards the outside in relation to the rotary bearing near the crank.

14 Claims, 3 Drawing Sheets

PEDAL FOR A BICYCLE OR SIMILAR DEVICE

This is a continuation of application Ser. No. 06/943,933, filed Dec. 19, 1986, which was abandoned upon the filing hereof, a continuation-in-part of Ser. No. 48,533 filed 5/5/87 (now U.S. Pat. No. 4,762,019), which was a continuation of Ser. No. 735,210 filed 5/17/85 and abandoned.

FIELD OF THE INVENTION

The invention relates to a pedal for a bicycle or similar device, of the kind comprising a pedal body containing a housing intended to accommodate a transverse spindle capable of being fixed on a crank, projecting at one end out of the housing, the pedal body being rotatably mounted on the said transverse spindle by means of two rotary bearings provided near the respective ends of the said spindle between the internal wall of the housing and the spindle. The spindle is tapered and the rotary bearing provided at the spindle end remote from the crank has an external diameter which is smaller than the external diameter of the rotary bearing capable of being fixed near the crank.

PRIOR ART

Japanese Utility Model application No. 88948/78, discloses a pedal of this known type. The sole of the shoe is intended to rest on the upper edge of two small transverse bars situated respectively ahead of and behind the pedal spindle.

The bearing surface of the shoe sole, and hence the bearing surface of the user's foot, is therefore at a relatively sizable distance above the pedal spindle. This distance is of the order of 17 mm in a conventional pedal. Such a distance is inconvenient because it may cause an unwanted rocking moment around the pedal spindle, this moment being the greater, the greater the said distance. In effect, the force resulting from the pedalling effort cannot permanently intersect the geometrical axis of the pedal during one pedalling revolution; when such a rocking moment occurs, the user must, even though he is not aware of it, devote a part of his effort, and hence of his pedalling power, to compensating for this rocking moment. Thus a loss of power and of efficiency ensues.

Moreover, when the crank passes towards the top dead centre position, the crank length is increased by the distance in question; on the other hand, at the bottom dead centre position the crank length is reduced by this distance. The force required from the user during one pedalling revolution will therefore vary for exerting a constant turning moment on the chainwheel; alternatively, if the user maintains his exertion at a constant level over one pedalling revolution, the applied turning moment varies according to the position of the crank.

Such a drawback becomes important for runs of long duration, for instance of several hours, especially in races. Pedalling techniques have been developed for offsetting this shortcoming created by the difference between the geometrical axis of the pedal and the bearing surface, these pedalling techniques demanding movements of the ankle and joints. The result is additional fatigue.

It is, moreover, desirable that any modification of a bicycle pedal with a view to reducing the distance referred to above should not entail any disadvantage in another field and, in particular, should not reduce the life of the pedal or its capability of rotating in the best possible way around its spindle, nor substantially modify the positioning of the foot on the pedal and the scope for releasing the foot from the pedal when desired.

OBJECTS OF THE INVENTION

It is a primary object of the invention to provide a pedal wherein the bearing surface for the user's foot should be at a smaller distance from the geometrical axis of rotation of this pedal, without thereby altering the qualities of rotation and life span of the pedal or the scope for positioning and releasing the user's foot.

It is a further object to reduce the weight of the pedal without diminishing its mechanical strength.

SUMMARY OF THE INVENTION

In accordance with the invention, a bicycle pedal or similar device of the kind defined above is characterised in that the pedal body has a bearing surface for the sole of the user's shoe, constituted by a portion of a flat surface substantially parallel to the geometrical axis of the pedal spindle, and extending as far as the external edge of the pedal body without any unevenness or projection, this bearing surface covering the rotary bearing and being situated at a distance from the geometrical axis which is smaller than the external radial dimension of the pedal barrel in the vicinity of the rotary bearing situated nearer the crank, this bearing surface being outwardly of said rotary bearing. Surface includes a rear edge which projects towards the rear with respect to the sleeve of the pedal. The rear edge includes a hook portion for engaging a block of a user's shoe.

Preferably, the bearing surface of the pedal body has a substantially rectangular shape, with its larger dimension oriented parallel to the geometrical axis whilst the smaller dimension of this surface is larger than the diameter of the pedal spindle.

Advantageously, the flat surface forming the bearing surface for the sole, is integral with the wall of the housing accommodating the pedal spindle.

The rotary bearing intended to be located nearer the crank comprises a ball bearing, and the hold of the pedal body in relation to the spindle along a direction parallel to the geometrical axis of the said spindle is solely ensured by the ball bearing whilst the rotary bearing provided at the end of the spindle which is remote from the crank is constituted by a needle bearing.

The internal race of the ball bearing is secured in relation to the spindle by means of an elastic stop segment anchored in this spindle and situated outwardly of the ball bearing, said internal race being secured on the other side by a shoulder of the pedal spindle whilst the external race of the ball bearing is secured on the inner side of the ball bearing, in relation to the wall of the housing of the pedal body, by means of an elastic stop segment anchored in said wall of the housing and, on the other side, by a circular shoulder provided in this wall of the housing.

The said rotary bearing remote from the crank, in particular the needle bearing, is situated inside the housing of the pedal body, in particular near the longitudinal median plane of the bearing surface, so as to absorb the major proportion of the pedalling effort. Preferably the rotary bearing, in particular the needle bearing, is disposed outwardly of this longitudinal median plane of the bearing surface, the median plane of the bearing orthogonal to the pedal spindle being situated in particular at a distance smaller than 10 mm from this longitudinal median plane.

The length of the portion of the pedal spindle situated inside the housing of the pedal body is smaller than the total length of this housing so that there exists a free space between the spindle end situated inside the housing and the external end of this housing.

The pedal body has a transition zone, in particular a substantially frusto-conical zone, between the portion surrounding the rotary bearing intended to be located nearer the crank and the portion situated outwardly of this bearing, the radial dimensions of this transition zone diminishing progressively in an outward direction, the above-mentioned portion of the pedal body situated outwardly of said rotary bearing being intended to serve as the bearing surface for the user's foot and being at a smaller distance from the geometrical axis of the said pedal spindle.

The outer end of the housing may be closed by a detachable plug. As a variant, the housing may be blind, in which case it is closed on the outside by a wall forming an integral part of the pedal body which ensures a perfect seal for the needle bearing.

The distance between the bearing surface of the user's sole and the geometrical axis of the pedal spindle is preferably less than 10 mm and in particular of the order of 9 mm.

Advantageously, the pedal spindle diameter is 8 mm in the vicinity of the needle bearing, and the external diameter of this needle bearing is 12 mm.

The transverse distance between the internal edge of the pedal body and the crank is sufficiently small so that in spite of the transition surface between the zone surrounding the rotary bearing near the crank and the bearing surface proper, the mean transverse distance between the longitudinal median plane of the bearing surface and the crank remains the same as in a conventional pedal. The transverse distance between the internal edge of the pedal body is, however, sufficiently great to allow easy fitting and removal of the pedal on the crank by means of a flat key or equivalent device of an appropriate thickness.

The pedal may comprise, in a manner similar to a conventional pedal, two transverse bars provided respectively in the front and at the rear, the upper edges of these bars forming part of the bearing surface and being situated in a plane tangential to the external wall of the housing; the distance from this plane to the geometrical axis of the pedal is smaller than the external dimension of the housing in the vicinity of the rotary bearing nearer the crank.

BRIEF DESCRIPTION OF THE DRAWINGS

Apart from the arrangement set out above, the invention consists of a certain number of other arrangements which will be discussed in greater detail below, in relation to a particular embodiment described with reference to the attached drawings but which is in no way restrictive.

DESCRIPTION OF THE PREFERRED EMBODIMENT

Figure 1:
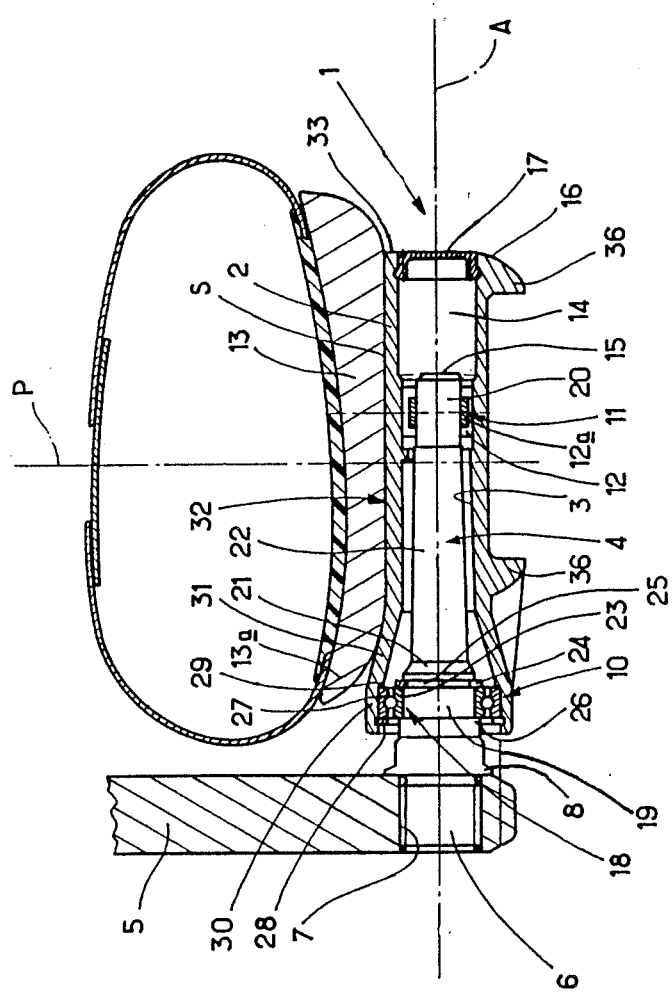
FIG. 1 of these drawings is a transverse cross-section of a pedal in accordance with the invention in the vicinity of the pedal spindle, with a schematic representation of a foot bearing on the pedal.

Referring to the drawings, and in particular to FIG. 1, there can be seen a bicycle pedal 1 or similar device comprising a pedal body 2 which defines a housing 3 intended to accommodate a transverse pedal spindle 4. This spindle projects at one end 6 from the housing 3 and is fixed to a crank 5, partly illustrated. Generally, this end 6 comprises an external thread allowing the crank to be screwed and locked in a tapped hole 7 of the crank. A shoulder 6 locks against the crank 5. Half flats such as 9 (FIG. 2) are provided on the external side of the shoulder 8 to allow tightening of the spindle 4 with a flat key inserted between the crank 5 and the pedal body 2.

Two rotary bearings 10, 11 near the respective ends of the spindle 4 mount the pedal body 2 rotatably on the spindle 4. These bearings 10 and 11 are disposed between the spindle 4 and the internal wall surface of the housing 3.

The rotary bearing 11 at the end of spindle 4 remote from the crank 5 is a needle bearing 12 whose external diameter d is smaller than the external diameter D of the rotary bearing 10 situated nearer the crank 5. The pedal body 2 has a bearing surface S for the user's foot, and in particular the sole 13 of his shoe, which is situated spaced from the geometrical axis A of the pedal spindle 4 by a distance h which is smaller than the external radial dimension b of the pedal body 2 in the vicinity of the rotary bearing 10.

The needle bearing 12 is situated inside housing 3 of the pedal body, near the longitudinal median plane P of the bearing surface S. This plane P is orthogonal to the spindle axis A; the pedalling force is applied near this plane P, which also corresponds substantially to the median plane M (FIG. 2) of the user's foot, in such a way that the needle bearing 12 absorbs the major proportion of the pedalling force.

This needle bearing 12 is preferably disposed outwardly of the median plane P of the bearing surfaces, the median plane Q of the needle bearing 12 orthogonal to axis A being spaced from the plane P by a distance f which is less than 10 mm. The needle bearing is disposed in the sleeve and the pedal has an upper wall 32 which extends transversely on its inside surface to the sleeve.

The length of the portion of the spindle 4 situated inside the housing 3 is smaller than the length of this housing 3, such that there exists a free space 14 between the end 15 of the spindle 4 inside the housing 3 and the external end 16 of the housing 3 itself.

It should be noted that since the length of the spindle 4 is reduced in relation to a conventional pedal spindle which completely passes transversely through the pedal, a weight saving is obtained in accordance with the invention.

The outer end of the housing 3 may be closed by a detachable plug 17.

In a variant, not shown, the housing 3 can be blind on the outside and closed by a wall forming an integral part of the pedal body 2.

The rotary bearing 10, near the crank 5 comprises a ball bearing 18 mounted on a part 19 of the spindle 4 whose diameter is larger than that of the outer end portion 20 of the spindle 4 on which the needle bearing 12 is mounted. The two portions 19 and 20 of the spindle 4 are cylindrical and are precision machined. The transition between these two portions is a frusto-conical zone 21 whose generatrices are steeply inclined towards the spindle axis A, this zone 21 having a reduced axial dimension and being followed by a portion 22 which is also frusto-conical of a greater length along axis A; the generatrices of the portion 22 are thus shallowly inclined in relation to the spindle axis A, and the transverse cross-section of the portion 22 diminishes progressively towards the end portion 20.

The external shell of the needle bearing 12 is tightly mounted in a corresponding bore portion of the housing 3, whilst the needles 12a of this bearing are freely mounted for axial translation in relation to the portion 20 of the spindle 4.

The internal race 23 of the ball bearing 18 is secured to the spindle 4 by means of an elastic stop means 24, for example a circlip, anchored in this spindle and more precisely in a peripheral groove 25 provided on the outer side of a portion 19 of this spindle, that is to say on the side remote from the crank 5. The other side of the internal race 23 is secured by a shoulder 26 of the spindle 4. The external race 27 of the ball bearing is secured on its inside, that is to say on the side nearer the crank 5, by an elastic stop means or circlip means 28 anchored in a groove in the housing 3, whereas on its other side the external race 27 is secured by a circular shoulder 29 in the wall of the housing.

The portion 30 of the pedal body surrounding the external race 27 of the ball bearing is substantially in the shape of a cylindrical sleeve. The pedal body 2 has a transition zone 31 between this portion 30 and the portion 32 of the barrel outwardly of the bearing 10; the upper surface of this portion 32 constitutes the bearing surface S. The transition zone 31 is preferably substantially frusto-conical, with its diameter progressively diminishing from the portion 30 as far as the portion 32.

As may be seen from FIG. 1, the sole 13 of the shoe bears essentially on the surface S which is substantially flat and parallel to the spindle axis A; only the rising internal edge 13a of the sole 13 is essentially in contact with the smaller diameter end of the frusto-conical transition zone 31.

The transverse distance t between the internal edge of the pedal body 2 (that is to say the internal surface of the sleeve 30) and the crank 5 is sufficient that the mean transverse distance L (FIG. 2) between the longitudinal median plane M of the shoe substantially orthogonal to axis A and the crank 5, remains the same as in a conventional pedal, in spite of the transition surface 31 on which substantially no part of the user's foot bears. This distance L is, in the embodiment described, approximately 51 mm for a shoe of European size 41. In practice, irrespective of the size of this shoe, the internal edge of the shoe is tangential to a plane U which is orthogonal to axis A and situated at a constant distance j (FIG. 2) from the crank 5. In one example of an embodiment of the invention, this distance j is of the order of 13 mm. In these circumstances, it will be understood that the distance L varies only slightly in accordance with the size of the user's foot (and hence the shoe size of the foot). This holds good for all types of pedal from the instant it is desired that the internal edge of the shoe should always occupy the same position in relation to the crank 5, irrespective of the size of the foot.

The mean distance K between the longitudinal median plane P of the bearing surface S and the crank 5 is substantially the same as in a conventional pedal.

The bearing surface S is advantageously constituted by a flat surface portion which is substantially parallel to the axis A and extends as far as the external edge 33 of the pedal body 2 without any unevenness or projection. It is thus possible for the user to slide his foot outwardly transversely over the surface S, for instance to release this foot from the pedal, without encountering any obstacle on the surface S. As may be seen in FIG. 2, this surface S can have a substantially rectangular shape whose larger dimension is orientated parallel to the axis A, whilst the small dimension of this surface S is distinctly larger than the diameter of the spindle 4, in particular more than twice this diameter.

Figure 2:
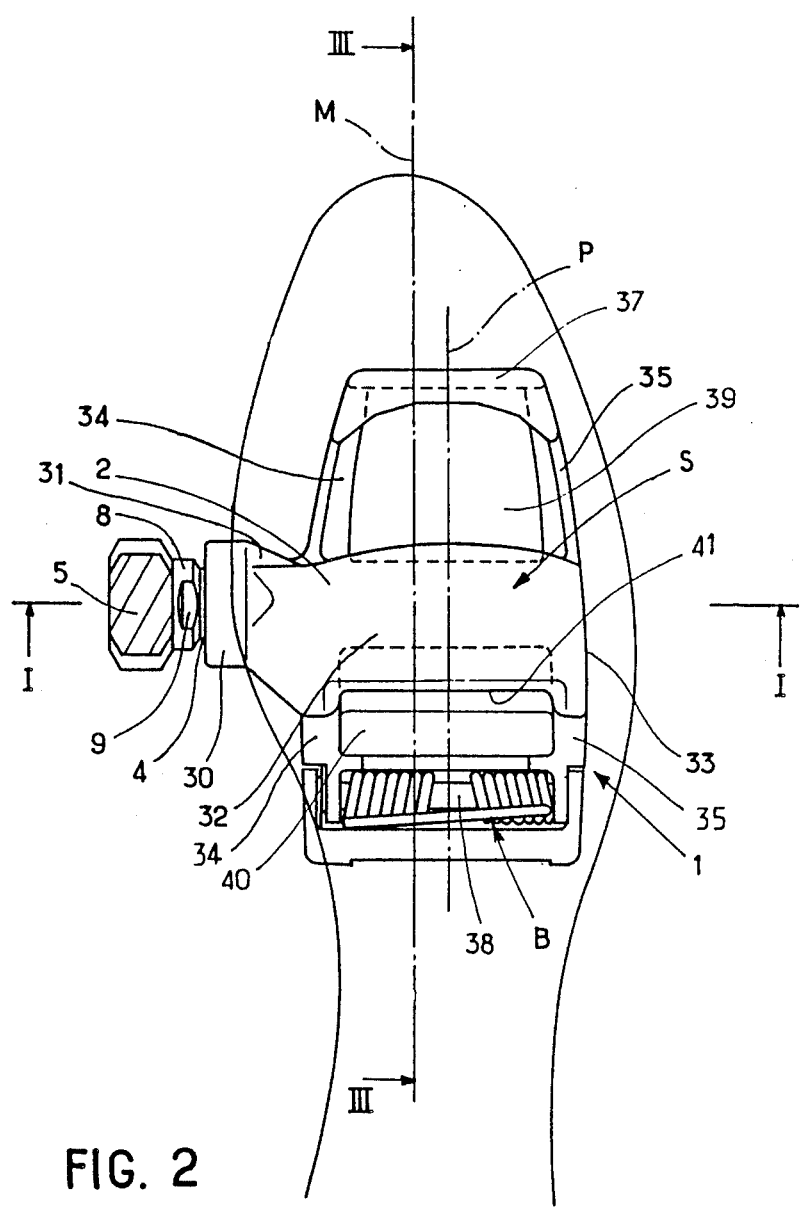
FIG. 2 is a plan view of the pedal of FIG. 1.

The pedal body 2 can be extended towards the front and towards the rear of the portion comprising the surface S by arms such as 34, 35 which can be seen in FIG. 2, joined at their front and rear ends respectively, these arms making it possible to complete the pedal body, more particularly with a view to mounting a device for fixing the shoe on the pedal. Such a fixing device B is shown in FIG. 2 and is described and claimed in French Patent Application No. 8407786 filed May 18, 1984 and published under No. 2564414, and in French Patent Application 8419173 filed Dec. 14, 1984 and published under No. 2574743.

Stiffener ribs such as 36 may be provided on the pedal body on the opposite side to the bearing surface S.

The pedal body 2 can be made as an integral unit in particular by being cast of a light moulded alloy.

The front ends of the arms 34, 35 are connected by a small transverse bar 37. The rear ends of the arms 34, 35 contain holes serving as bearings for a spindle 38 for an automatic fastening device B for the shoe.

An elongate, substantially rectangular opening 39 is delimited by the front bar 37 and the front edge of the bearing surface S.

A substantially rectangular window opening 40 extends towards the rear from the rear edge 41 of the bearing surface S.

This rear edge 41 is, as may be seen in FIG. 2, rectilinear and parallel to the pedal axis A. As may be seen in FIG. 3, the edge 41 projects rearwardly in relation to the sleeve 42 of the pedal which receives the spindle 4 (not shown in FIG. 3). This edge 41 may serve as a fastening edge for a block 43 fixed under the sole 13 of the shoe. The distance m (FIG. 3) between the rear edge 41 and the geometrical axis A of the pedal is preferably less than 20 mm.

Figure 3:
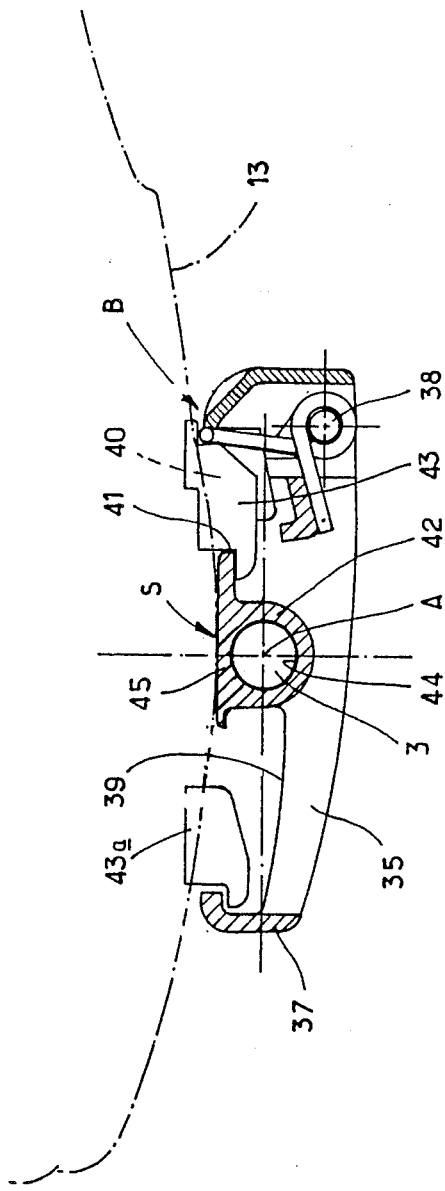
FIG. 3 is a cross-section along line III—III of FIG. 2.

As may be seen in FIG. 3, the longitudinal dimension n of the bearing surface is distinctly smaller than the total length s of the pedal, in particular less than half and is preferably substantially of the order of one third of s. The bore 44 accommodating the needle bearing is made directly in the sleeve 42. The internal face of the upper wall 45 of the pedal body is tangential to the bore 44. The thickness g of the wall 45 is chosen to be as small as possible, in particular of the order of 3 mm. Since the diameter of the bore 44 can be 12 mm, it follows that the distance h of the surface S from the axis A can be reduced to: $(12/2)+3=9$ mm.

It should be noted that the shoe sole block 43 is accommodated in the window 40, in the same way as a block 43a situated nearer the front under the sole 13 of the shoe is accommodated in the window 39. Thus, the sole 13 can bear directly on the surface S.

The assembly of the components of a pedal in accordance with the invention follows directly from the explanations given above.

The ball bearing 18 is mounted on the cylindrical portion 19 of the spindle 4, and the internal race 23 of this ball bearing is secured by the positioning of the elastic segment 24 in the groove 25.

The spindle 4 is then inserted in the housing 3 of the pedal body 2 until the external race 27 of the ball bearing 18 abuts the shoulder 29. The elastic segment 28 is then positioned in the groove provided for this purpose so as to secure the race 27 completely.

Through the other end of the housing 3, stripped of its plug 17, the needle bearing 12 is inserted in the space 14, the needles 12a being engaged around the bearing surface 20 of the end of the spindle 4 whilst the external race of the bearing 12 is engaged with a tight fit in portion 44 of the housing 3 provided for this purpose. The plug 17 is then placed in position.

The barrel 2 is held in relation to the spindle 4, along a direction parallel to the axis A, solely by the ball bearing 23.

The pedalling forces orientated substantially orthogonal to the axis A are essentially absorbed by the needle bearing 12 specially adapted for such radial work.

A pedal in accordance with the invention allows the bearing surface S to be brought very near the axis A, whilst retaining a high quality assembly for rotation about the spindle 4 which is rectilinear, is anchored in the crank 5 and extends in the pedal body 2 beyond the longitudinal median plane P. The conditions for positioning the foot on the pedal, or of withdrawing this foot, are not altered and are even improved.

The reduction of the distance between the sole of the shoe and the pedal axis makes it therefore possible to lower the bicycle saddle and to reduce the dimensions of the frame. This leads to a saving in weight which is added to that procured by the pedal construction in accordance with the invention.

The reduction of the distance between the bearing surface and the geometrical axis A, brought about by the needle bearing, is relatively great. For instance, in the case of a spindle whose diameter is 8 mm, the external diameter of a ball bearing for such a spindle is of the order of 22 mm, whilst the external diameter of a needle bearing for this same spindle is of the order of 12 mm.

It should be noted that numerous variants of the above described embodiment are possible within the scope of the invention.

For instance, the pedal can comprise transverse small bars at the front and at the rear whose edges form part of the bearing surface and are situated in a plane passing through this bearing surface.

In the case where the housing 3 is a blind one, the machining of the bearing surfaces of this housing 3 and the assembly of the bearing 12 would be carried out from the only open end, at the side nearer the crank 5.

I claim:

1. A bicycle pedal or the like comprising:
    (a) pedal body means defining a housing;
    (b) a transverse spindle defining an axis of rotation and having first and second ends with said first end projecting out of the housing and adapted to be fixed to a crank;
    (c) first and second rotary bearings provided respectively near the first and second ends of said spindle, for rotatably mounting said pedal body means on said transverse spindle, said second rotary bearing having an external diameter which is smaller than the external diameter of the first rotary bearing, said housing including a barrel having an external radial dimension and surrounding said first bearing, said second rotary bearing being a needle bearing having an external diameter which is smaller than the external diameter of said first rotary bearing, said housing including a sleeve portion in which said spindle of the pedal extends; and
    (d) means defining a bearing surface on the pedal body means for the sole of the user's foot, said bearing surface being constituted by a substantially flat surface which is parallel to the geometrical axis of the said spindle and extends as far as the external edge of the pedal body means without any unevenness or projection, said bearing surface extending over said second rotary bearing and being situated at a distance from said geometrical axis which is smaller than the external radial direction of the barrel in the vicinity of said first rotary bearing, and said bearing surface being situated outwardly of said first rotary bearing, said bearing surface including a rear edge which projects towards the rear with respect to said sleeve portion of the pedal and said rear edge including a hook portion for engaging a block of a user's shoe, said body of the pedal including a pair of side arms each extending rearwardly to define an opening between said arms for receiving the block of the shoe of the user, said side arms having ends carrying support means supporting automatic engaging means for holding the block of a user's shoe when inserted in said opening.

2. A pedal according to claim 1, wherein the bearing surface of the pedal body means has a substantially rectangular shape whose larger dimension is parallel to said axis of rotation, whilst the smaller dimension of this surface is larger than the diameter of said pedal spindle.

3. A pedal according to claim 2, wherein the smaller dimension of the bearing surface is more than twice the diameter of the pedal spindle.

4. A pedal according to claim 1 wherein the external diameter of said needle bearing is 12 mm, and said pedal spindle diameter is 8 mm.

5. A pedal according to claim 1, wherein said bearing surface has a longitudinal median plane and said second rotary bearing is a needle bearing having a median axial plane which is situated outwardly of the longitudinal median plane of said bearing surface of the pedal by a distance which is less than 10 mm.

6. A pedal according to claim 1, wherein the pedal body means has a transition zone between a pedal body portion surrounding said first rotary bearing and a further pedal body portion disposed outwardly of said first rotary bearing, said further pedal body portion defining said bearing surface.

7. A pedal according to claim 6, wherein said transition zone is frusto-conical.

8. A pedal according to claim 6, wherein said bearing surface has a longitudinal median plane and the pedal spindle has means defining an abutment for a crank in which the pedal spindle is to be secured by its said first end, and wherein the transverse distance between the internal edge of the pedal body means and said crank abutment is sufficiently small that the mean transverse distance between the longitudinal median plane of said bearing surface and said crank abutment is substantially reduced.

9. A pedal according to claim 1, wherein the distance between the bearing surface for the sole of the user's foot, and said axis of rotation defined by the transverse pedal spindle is less than 10 mm.

10. A pedal according to claim 9, wherein said distance is substantially equal to 9 mm.

11. A pedal according to claim 1, including means defining a window delimited by the front edge of the bearing surface, and means defining a further window delimited by the rear edge of the bearing surface, said rear edge being rectilinear and parallel to said axis of rotation defined by the pedal spindle.

12. A pedal according to claim 11, wherein the distance of the rear edge of the pedal bearing surface from the axis of rotation defined by the pedal spindle is less than 20 mm.

13. The pedal as claimed in claim 1 wherein said rear edge of said bearing surface is located at a distance from the geometrical axis of the pedal with said distance being less than 20 mm.

14. The pedal as claimed in claim 1 wherein said pedal body means has an upper wall which extends on its inside surface to a bore of said pedal body means.

* * * * *